Oct. 7, 1969  H. A. CARLSON ET AL  3,471,123

FUEL CONTROL VALVE FOR A CARBURETOR

Filed April 1, 1960

INVENTORS
HAROLD A. CARLSON
ALEX N. SZWARGULSKI
BY
Charles H. Bassett
ATTORNEY

United States Patent Office 3,471,123
Patented Oct. 7, 1969

3,471,123
FUEL CONTROL VALVE FOR A CARBURETOR
Harold A. Carlson, Brentwood, and Alex N. Szwargulski, St. Louis, Mo., assignors to ACF Industries, Incorporated, New York, N.Y., a corporation of New Jersey
Continuation-in-part of application Ser. No. 856,893, Nov. 27, 1959. This application Apr. 1, 1960, Ser. No. 19,234
Int. Cl. F16k 21/16
U.S. Cl. 251—362                5 Claims

ABSTRACT OF THE DISCLOSURE

A fuel inlet valve for a carburetor comprising a body having a shoulder formed therein, an annular resilient ring mounted on the shoulder and held in place by a retainer ring. The valve is further provided with a valve member of polygonal cross section and a conical tip, which tip contacts the resilient ring for sealing the valve and moves away from the ring for opening the valve.

---

This application is a continuation-in-part of application Ser. No. 856,893, filed Nov. 27, 1959, now Patent No. 3,059,898, issued Oct. 23, 1962.

This invention relates to carburetors for internal combustion engines, and more particularly to float actuated needle valves for maintaining a predetermined constant fuel level within a fuel bowl.

Conventional float actuated needle valves for carburetors comprise a valve body having a metallic seat for engagement by the tapered end of a metallic needle. To prevent leakage and flooding of the carburetor, the needle and seat must be manufactured to exact tolerances, and the fuel must be free from particles of foreign material which might interfere with proper seating of the needle. When carburetors of this type are used on engines employed to drive boats, automobiles, and airplanes, engine vibration or rough travel of the vehicle may cause the float to oscillate and open the needle valve when additional fuel is not required in the fuel bowl.

It is therefore an object of the invention to provide a carburetor needle valve structure adapted to insure proper seating of the needle against the valve seat to prevent flooding of a carburetor.

Another object of the invention resides in the provision of a carburetor needle valve provided with a seat ring formed of resilient gasoline resistant material adapted to absorb vibrations of the needle and float to prevent unseating of the needle and opening of the valve when the fuel in the bowl is at its predetermined constant level.

A further object of the invention resides in the provision of a carburetor needle valve structure in which a resilient seat ring is formed with a relatively sharp inner peripheral edge for engagement by the conical tip of a valve needle, whereby particles of dirt in the fuel will not interfere with proper seating of the needle.

Another object of the invention resides in the provision of means for mounting a resilient seat ring in leakproof engagement against an annular shoulder formed in a valve body.

Another object of the invention resides in the provision of a carburetor needle valve which is inexpensive to manufacture and reliable in use.

The invention embodies other novel features, details of construction and arrangement of parts which are hereinafter set forth in the specification and claims, and illustrated in the accompanying drawing, forming part thereof, wherein:

Figure 1:
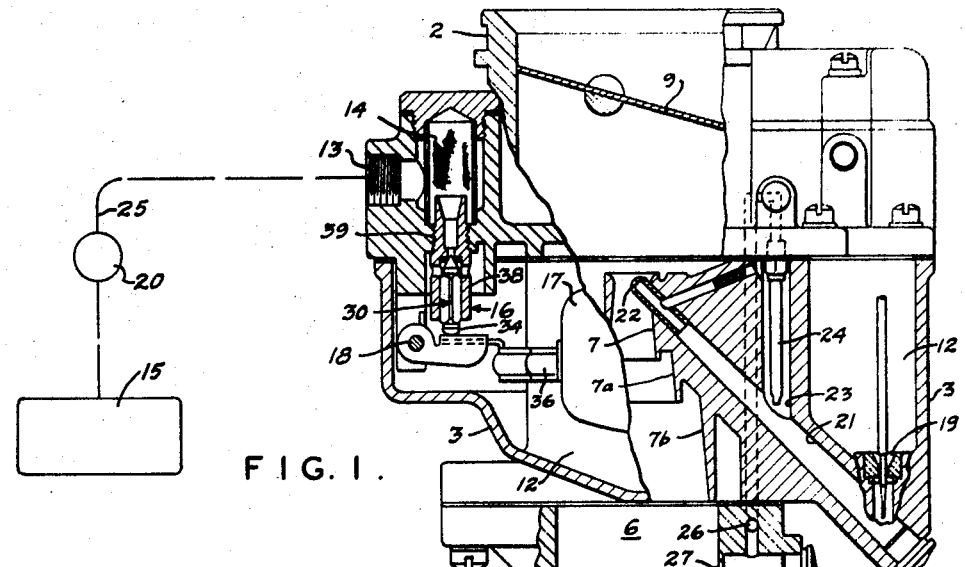
FIG. 1 is a vertical section, partly in side elevation, illustrating a carburetor provided with a float actuated needle valve embodying features of the invention.
Figure 2:
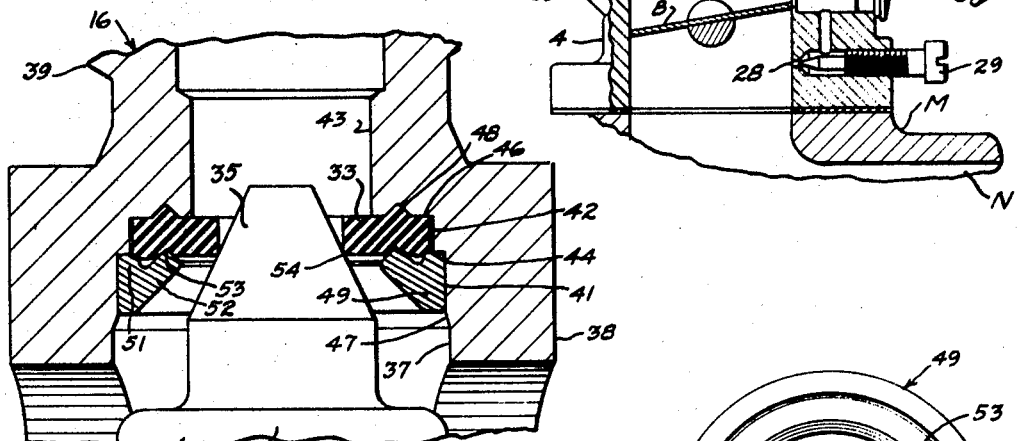
FIG. 2 is an enlarged fragmentary longitudinal section showing the needle valve structure.

Referring now to the drawing for a better understanding of the invention, a downdraft carburetor is shown as comprising an air horn section 2, a main body section 3, and an outlet section 4, said sections being secured together and forming a mixture conduit 6 having a stack of venturis 7, 7a and 7b in the main body section. The carburetor is mounted on the intake manifold M of a conventional internal combustion engine N adapted for use in driving a vehicle.

A conventional choke valve control mechanism 9, operable responsive to intake manifold suction and temperature, is provided to control the operation of a choke valve provided in the air inlet end of the mixture conduit 6. A throttle valve 8 is disposed in the outlet end of the mixture conduit and is connected by means of a suitable linkage to an accelerator pedal for control by the operator.

The main body section 3 is provided with a fuel bowl 12 having a fuel inlet 13 provided with a screen filter 14 and a fuel inlet valve 16. A float 17 is pivotally mounted at 18 within the fuel bowl to actuate the valve to maintain a substantially constant fuel level within the bowl. Fuel is supplied to the bowl from a fuel tank 15 by means of a conventional engine operated fuel pump 20 interposed in a fuel conduit 25 leading to the fuel inlet 13.

A fuel metering orifice 19 leads from the fuel bowl to an upwardly inclined main fuel passage 21 having a main fuel nozzle 22 discharging into the primary venturi 7. An idling fuel system is shown as comprising a fuel well 23 leading upwardly from the main passage 21, the well having a metering tube 24 therein communicating with an idle passage 26 provided with idle ports 27 and 28. An idle adjustment screw 29 is provided for the idle port 28.

As illustrated in FIGS. 2 to 5 in the drawing, the fuel inlet valve 16 is shown as comprising a needle 30 formed with a body 31 of non-circular cross section having flat sides, for example, as shown in FIGURE 1. One end of the needle is formed with a conical tip 35 to engage a seat ring 33, the other end of the needle being formed with a rounded head 34 for engagement by the float arm 36. The needle is formed of stainless steel, or other suitable material, and mounted for reciprocative movement within a cylindrical bore 37 formed in a valve body 38. One end of the valve body is formed with external threads 39 for detachable engagement within a threaded aperture leading through a wall of the carburetor to the interior of the fuel bowl 12.

The valve body 38 is formed with cylindrical bores 41, 42 and 43 concentric with the bore 37. The bore 41 terminates at a shoulder 44, and the bore 42 terminates at a shoulder 46. A tapered shoulder 47 merges with the bores 37 and 41. The shoulder 46 is formed with an annular V-shape groove 48 concentric with the several bores in the valve body.

Figure 3:
FIG. 3 is a transverse detail section showing the resilient seat ring.
Figure 5:
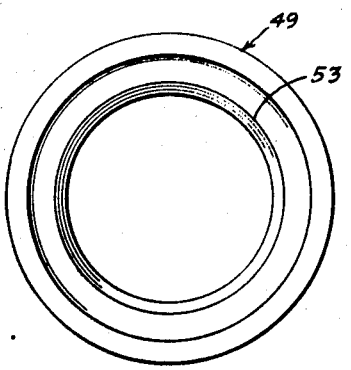
FIG. 5 is a plan view of the retainer.
Figure 4:
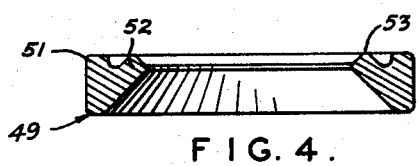
FIG. 4 is a transverse detail section showing a seat ring retainer.

The seat ring 33 is shown in FIG. 3 as comprising a cylindrical ring of resilient synthetic rubber-like material resistant to gasoline, the seat ring being molded or cut from flat sheet material. The thickness of the seat ring is slightly greater than the length of the bore 42, and the outer diameter of the seat ring is slightly smaller than the diameter of the bore 42 to permit radial swelling or expansion of the seat ring during assembly and use. The inner diameter of the seat ring is smaller than the diameter of the bore 43 to provide an inner annular peripheral portion flexible axially of the valve body to yieldably resist axial vibratory movements of the needle 30.

The seat ring 33 is clamped in fixed, leakproof engagemen against the shoulder 46 by a metallic ring-shape retainer 49 press-fitted into the bore 41 and into abutting engagement against the shoulder 44. The retainer 49 is generally V-shape in section to provide an outer annular portion 51 in press-fit engagement in the bore 41 and an inner annular portion 52 formed with an annular V-shape rib 53 concentric with said bore and engaging the seat ring 33 intermediate the inner and outer peripheries thereof. The diameters of the groove 48 and rib 53 are preferably identical to cause an annular portion of the seat ring between its inner and outer peripheries to be displaced axially by the rib toward and into the groove 48 during assembly to provide a leakproof joint between the seat ring and shoulder 46 without changing the diameter or shape of the inner periphery of the ring.

The included angle of taper of the conical tip 35 of the needle 30 is from 60° to 90° for seating engagement against the sharp inner circular edge 54 of the seat ring 33. The seat ring 33 may be formed of various synthetic rubber-like materials, such as Viton A, which are now available on the market. The resilient seat ring 33 may have a durometer hardness of from 60 to 90 for use with a needle 30 of the type shown and described.

In the operation of the needle valve, it will be noted that the resilient inner peripheral portion of the seat ring 33 is adapted to flex axially to absorb vibratory movements of the needle and float without opening the valve when the fuel in the bowl is at its predetermined constant level. It will also be noted that small particles of dirt in the fuel, or slight misalignment of the needle and seat, will not prevent proper closing of the valve.

We claim:

1. A fuel control valve for a carburetor, said valve comprising a valve body having a passage therethrough formed with a plurality of successive coaxial bores of increasing diameter, said body formed with a first shoulder in a plane normal to the common axis of said bores and between a first one of said bores and a second one of said bores of larger diameter and a second shoulder in a plane normal to the common axis of said bores between said second bore and a third one of said bores of larger diameter than said second bore, said first shoulder having an annular groove in the surface thereof and coaxial with said bores, a resilient cylindrical valve seat ring having flat end surfaces and mounted on said first shoulder with one of said seat ring surfaces abutting against said first shoulder surface, said seat ring extending radially inwardly beyond said first bore so that the inner periphery of said seat ring partially closes said first bore, said seat ring having a thickness greater than the length of said second bore whereby the other end surface of said seat ring extends axially beyond said second shoulder, an annular retainer ring pres-fitted into said third bore with a peripheral portion thereof abutting said second shoulder, another portion of said retainer ring extending radially inwardly beyond said second shoulder and having an annular rib engaging said other seat ring surface to displace part of said seat ring into said annular groove and to form a leakproof seal between said seat ring and said first shoulder, and a valve structure mounted for movement within said valve body, said valve structure having a tapered end operatively positioned within said seat ring.

2. A fuel control valve for a carburetor, said valve comprising a valve body having a passage therethrough formed with a plurality of successive coaxial bores of increasing diameter, said body formed with a first shoulder between a first one of said bores and a second one of said bores of larger diameter and a second shoulder between said second bore and a third one of said bores of larger diameter than said second bore, said first shoulder having an annular groove in the surface thereof and coaxial with said bores, a resilient valve seat ring having flat end surfaces and mounted on said first shoulder with one of said seat ring surfaces abutting against said first shoulder surface, said seat ring extending radially beyond said first bore so that the inner periphery of said seat ring partially closes said first bore, said ring having a thickness greater than the length of said second bore whereby the other end surface of said seat ring extends axially beyond said second shoulder, an annular retainer ring press-fitted into said third bore and abutting said second shoulder, a portion of said retainer ring extending radially inwardly beyond said second shoulder and having an annular rib engaging said other seat ring surface to displace a portion of said seat ring into said annular groove to form a leakproof seal between said seat ring and said first shoulder, and a valve structure mounted for movement within said valve body, said valve structure having a tapered end operatively positioned within said seat ring.

3. A fuel control valve for a carburetor, said valve comprising a valve body having a passage therethrough formed with a plurality of successive coaxial bores of increasing diameter, said body formed with a first shoulder between a first one of said bores and a second one of said bores of larger diameter and a second shoulder between said second bore and a third one of said bores of larger diameter than said second bore, said first shoulder having an annular V-shaped groove in the surface thereof and coaxial with said bores, a resilient valve seat ring mounted on said first shoulder and abutting against said first shoulder surface, said seat ring extending radially inwardly beyond said first bore so that the inner periphery of said seat ring partially closes said first bore, said ring having a thickness greater than the length of said second bore whereby said seat ring extends axially beyond said second shoulder, an annular retainer ring press-fitted into said third bore and abutting said second shoulder, a portion of said retainer ring extending radially inwardly beyond said second shoulder and having an annular V-shaped rib engaging said seat ring to displace a portion of said seat ring into said annular groove to form a leakproof seal between said seat ring and said first shoulder, and a valve structure mounted for movement within said valve body, said valve structure having a tapered end operatively positioned within said seat ring.

4. A fuel control valve for a carburetor, said valve comprising a valve body having a passage therethrough formed with a plurality of successive coaxial bores of increasing diameter, said body formed with a first shoulder between a first one of said bores and a second one of said bores of larger diameter and a second shoulder between said second bore and a third one of said bores of larger diameter than said second bore, said first shoulder having an annular V-shaped groove in the surface thereof and coaxial with said bores, a resilient cylindrical valve seat ring having flat end surfaces and mounted on said first shoulder with one of said ring surfaces abutting against said first shoulder surface, said seat ring extending radially inwardly beyond said first bore so that the inner periphery of said ring is unsupported by said first shoulder and can flex axially in said passage, said seat ring having a thickness greater than the length of said second bore whereby said other end surface extends axially beyond said second shoulder, an annular retainer ring press-fitted into said third bore and abutting said second shoulder, said retainer ring having a portion extending radially beyond said second shoulder with an annular V-shaped rib engaging said other seat ring surface between the inner and outer peripheries thereof to displace a portion of said one abutting seal ring surface into said annular groove to form a leakproof seal between said abutting seat ring surface and said first shoulder, and a valve structure mounted for movement within said valve body, said valve structure having a tapered end operatively positioned within said seat ring.

5. A fuel control valve for a carburetor, said valve comprising a valve body having a passage therethrough formed with a plurality of successive coaxial bores of increasing diameter, said body formed with a first shoulder having a surface in a plane normal to the common axis of said bores and between a first one of said bores and a second one of said bores of larger diameter and a second shoulder having a surface in a plane normal to the common axis of said bores between said second bore and a third one of said bores of larger diameter than said second bore, said first shoulder having an annular V-shaped groove in the surface thereof and coaxial with said bores, a resilient cylindrical valve seat ring having flat end surfaces and mounted on said first shoulder with one of said seat ring surfaces abutting against said first shoulder surface, said seat ring extending radially inwardly beyond said first bore so that the inner periphery of said seat ring partially closes said first bore, the outer periphery of said seat ring being spaced from the wall of said second bore, said seat ring having a thickness greater than the length of said second bore whereby the other end surface of said seat ring extends axially beyond said second shoulder, an annular retainer ring press-fitted into said third bore with a peripheral portion thereof abutting said second shoulder, another portion of said retainer ring extending radially inwardly beyond said second shoulder and having an annular V-shaped rib of equal diameter to and coaxial with said groove and engaging said other seat ring surface between the inner and outer peripheries thereof to displace part of said abutting seal ring surface into said annular groove to form a leakproof seal between said abutting seat ring surface and said first shoulder, and a needle valve structure mounted for axial movement within said third bore, said needle valve having a tapered end operatively positioned within said seat ring.

References Cited
UNITED STATES PATENTS

| | | | |
|---|---|---|---|
| 2,935,995 | 5/1960 | Rucker | 251—364 X |
| 2,979,067 | 4/1961 | Kern | 251—362 X |
| 2,678,663 | 5/1954 | Chyba | 137—791 |
| 2,645,449 | 7/1953 | Gulick. | |
| 2,953,347 | 9/1960 | Phillips | 251—361 |

SAMUEL SCOTT, Primary Examiner

U.S. Cl. X.R.

137—434; 251—363, 364